US010968109B2

(12) United States Patent
Wang et al.

(10) Patent No.: US 10,968,109 B2
(45) Date of Patent: Apr. 6, 2021

(54) METHOD FOR SYNTHESIZING MORDENITE MOR MOLECULAR SIEVE, AND PRODUCT AND USE THEREOF

(71) Applicant: DALIAN INSTITUTE OF CHEMICAL PHYSICS, CHINESE ACADEMY OF SCIENCES, Dalian (CN)

(72) Inventors: Linying Wang, Dalian (CN); Peng Tian, Dalian (CN); Zhongmin Liu, Dalian (CN); Hongyi Yang, Dalian (CN); Xuebin Zhao, Dalian (CN); Beibei Gao, Dalian (CN); Yuyan Qiao, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 82 days.

(21) Appl. No.: 16/467,818

(22) PCT Filed: Dec. 9, 2016

(86) PCT No.: PCT/CN2016/109273
§ 371 (c)(1),
(2) Date: Jun. 7, 2019

(87) PCT Pub. No.: WO2018/103089
PCT Pub. Date: Jun. 14, 2018

(65) Prior Publication Data
US 2020/0109057 A1 Apr. 9, 2020

(51) Int. Cl.
C01B 39/26 (2006.01)
B01J 29/18 (2006.01)

(52) U.S. Cl.
CPC .............. *C01B 39/26* (2013.01); *B01J 29/18* (2013.01); *C01B 39/265* (2013.01)

(58) Field of Classification Search
CPC .......... C01B 39/26; C01B 39/265; B01J 29/18
See application file for complete search history.

(56) References Cited

U.S. PATENT DOCUMENTS 5,219,546 A    6/1993  Hellring et al.
2019/0284115 A1*  9/2019  Ramakrishna ............ B01J 29/24

FOREIGN PATENT DOCUMENTS

CN          1243100 A      2/2000
CN          1524788 A      9/2004
(Continued)

OTHER PUBLICATIONS

Zhou et al, "Preparation and microstructural analysis of high-performance mordenite membranes in fluoride media", Microporous and Mesoporous Materials, 156 (2012) 166-170 (Year: 2012).*
(Continued)

*Primary Examiner* — David M Brunsman
(74) *Attorney, Agent, or Firm* — Maier & Maier, PLLC

(57) ABSTRACT

A method for synthesizing a mordenite (MOR) molecular sieve with a modulatable location and distribution of B acid sites, and a product thereof and the use thereof. Provided is a method for synthesizing a mordenite MOR molecular sieve with acid sites located at an 8-membered ring "side pocket" in communication with a 12-membered ring pore channel in the presence or absence of an inorganic base. The method includes introducing an additional reagent and an optional fluorinating reagent which have different structures and charge densities into a synthetic gel, and the B acid sites of the obtained MOR zeolite are located at an 8-membered ring "side pocket" in communication with a 12-membered ring pore channel A catalyst product obtained exhibits an excellent performance in terms of adsorption and catalysis.

(Continued)

The synthesis method has broad industrial application, particularly being applied to catalysts for the carbonylation reaction of dimethyl ether.

9 Claims, 2 Drawing Sheets

(56) References Cited

FOREIGN PATENT DOCUMENTS

| | | |
|---|---|---|
| CN | 101716470 A | 6/2010 |
| CN | 104016371 A | 9/2014 |
| CN | 106032281 A | 10/2016 |
| JP | S6252121 A | 3/1987 |
| WO | 2008147190 A1 | 12/2008 |
| WO | 2016/126431 A1 | 8/2016 |

OTHER PUBLICATIONS

Oumi et al, "Influences of aliphatic alcohols an crystallization of large mordentie cyrstals and their sorption properties", Journal of Materials Chemistry, 2003, 13, 181-185 (Year: 2003).*

Nishiyama et al, "A defect-free mordenite membrane synthesized by vapour-phase transport method", J. Chem. Soc., Chem. Comm 1995, 1967-1968 (Year: 1995).*

Translation of International Search Report and Written Opinion dated Jul. 18, 2017 in corresponding International Application No. PCT/CN2016/109273; 6 pages.

European search report dated Apr. 6, 2020, in corresponding European patent application No. 16923613.0, 31 pages.

Wang et al., "Modifying the acidity of H-MOR and its catalytic carbonylation of dimethyl ether", Chinese Journal of Catalysis, vol. 37, 2016, pp. 1530-1537.

Hashimoto et al., "Effect of superfine particles of alumina incorporated in the cavities of mordenite in enhancing selectivity", Applied Catalysis A: General, vol. 180, 1999, pp. 367-374.

\* cited by examiner

METHOD FOR SYNTHESIZING MORDENITE MOR MOLECULAR SIEVE, AND PRODUCT AND USE THEREOF

This application is a 371 filing of PCT/CN2026/109273, filed Dec. 9, 2016.

FIELD

The invention belongs to the fields of inorganic porous materials, adsorption materials and catalytic materials, and particularly relates to a method for synthesizing mordenite MOR molecular sieve, product and use thereof.

BACKGROUND

Porous materials are widely used in many fields such as adsorption, separation, ion exchange and catalysis, and so forth because of their specific channel framework and uniform pore size. Mordenite (MOR) is one of the earliest known zeolites, which comprises two types, i.e. natural and synthetic zeolites. Natural mordenite was first named by How in 1864.

FIG. 1 shows a schematic view of the channel framework of MOR molecular sieve. As shown in FIG. 1, MOR molecular sieves have two parallel channels of 12-membered ring and 8-membered ring in the [001] direction and the channel sizes are 6.5 Å×7.0 Å and 2.6 Å×5.7 Å respectively. It is generally considered that reactant molecules cannot diffuse in such 8-membered ring channel since the channel diameter of 8-membered ring in the [001] direction is too small. In addition, there is an 8-membered ring channel in the [010] direction. The orifice size is about 3.4 Å×4.8 Å, this channel is in communication with the main channel of the 12-membered ring, so it is also called "side pocket".

Mordenite has excellent heat resistance, acid resistance and water vapor resistance, and is widely used as an adsorbent for separating gas or liquid mixtures and a catalyst for petrochemical and fine chemicals. Depending on the size of the reactants, products, and reaction intermediates, reactions involving larger size molecules are generally considered to occur only within the main channel of 12-membered ring. However, for some specific reactions, such as the vapor-phase carbonylation reaction of dimethyl ether and CO, the 8-membered ring "side pocket" is considered to be the only reaction site. The researchers found that the dimethyl ether carbonylation activity of the MOR molecular sieve is proportional to the amount of B acid in the molecular sieve "side pocket" regardless of the acid density in the channel of 12-membered ring. (E. Iglesia, et al. Acc. Chem. Res. 2008, 14(4), 559-567). The location and distribution of B acid sites in the molecular sieve are closely related to the synthesis method of the molecular sieve (J. Ddeek, et al. Catal, Catal. Reviews: Science and Engineering, 2012, 54 (2), 135-223), and there are few studies on the directly obtaining of MOR molecular sieves with a modulatable location and distribution of B acid sites by effectively controlling the synthesis process.

SUMMARY

It is an object of the present invention to provide a method for synthesizing MOR molecular sieves wherein the location and distribution of B acid sites can be modulated directly.

In one aspect, the present invention provides a method for synthesizing a mordenite MOR molecular sieve with B acid sites being preferentially located in an 8-membered ring "side pocket" in the presence of an inorganic base, the method comprises:

a) mixing an aluminum source in terms of $Al_2O_3$, a silicon source in terms of $SiO_2$, an inorganic base $M_2O$, an additional reagent N, and water $H_2O$ to form an initial mixture A with the following molar ratio composition:

$Al_2O_3:SiO_2$=0.005 to 0.1:1

$M_2O:SiO_2$=0.05 to 1:1

$N:SiO_2$=0.1 to 1:1

$H_2O:SiO_2$=5 to 60:1;

b) adding a seed crystal S of mordenite MOR molecular sieve into the initial mixture A obtained in step a), and stirring uniformly to obtain an initial gel B, wherein the mass ratio of the added seed crystal S to $SiO_2$ contained in the initial mixture A is $S:SiO_2$=0.005 to 0.1:1;

c) crystallizing the initial gel B obtained in step b) at a temperature in a range from 120° C. to 200° C. under autogenous pressure for 12 hours to 240 hours;

d) filtering the solid product, separating and washing the solid product to neutral with deionized water after the crystallization is completed, and then drying the solid product to obtain mordenite MOR molecular sieves, wherein M in the inorganic base $M_2O$ represents an alkali metal; the additional reagent N matches with the channel size of the 8-membered ring "side pocket" and is one or more selected from the group consisting of methylamine, dimethylamine, trimethylamine, ethylamine, diethylamine, triethylamine, N-methyldiethylamine, N,N-dimethylethylamine, N-methylethylenediamine, N,N-dimethylethylenediamine, N,N,N-trimethylethylenediamine, N-ethylethylenediamine, N,N-diethylethylenediamine, N,N,N-triethylethylenediamine, N-methyl-N,N-diethylethylenediamine, N,N dimethyl-N-ethylethylenediamine, N,N,N,N-tetramethylethylenediamine, n-propylamine, di-n-propylamine, isopropylamine, tetramethylammonium hydroxide, tetramethylammonium bromide, tetramethylammonium chloride, tetramethylammonium iodide, methanol, ethanol, n-propanol and isopropanol.

In a preferred embodiment, the aluminum source is one or more selected from the group consisting of aluminum isopropoxide, aluminum oxide, aluminum hydroxide, aluminum chloride, aluminum sulfate, aluminum nitrate, and sodium aluminate.

In a preferred embodiment, the silicon source is one or more selected from the group consisting of coarse pore silicon powder, fine pore silicon powder, silica sol, silicone gel, tetramethoxysilane, tetraethoxysilane, white carbon black, and water glass.

In a preferred embodiment, wherein the inorganic base is one or two selected from the group consisting of lithium hydroxide and sodium hydroxide.

In another aspect, the present invention provides a method for synthesizing a mordenite MOR molecular sieve with B acid sites being preferentially located in the"side pocket" of 8-membered ring channel in the absence of inorganic base, wherein alkali metal is absent from the reaction system, the method comprises:

a) mixing an aluminum source in terms of $Al_2O_3$, a silicon source in terms of $SiO_2$, an additional reagent N, fluorine-containing reagent F and water $H_2O$ to form an initial mixture A with the following molar ratio:

$Al_2O_3:SiO_2$=0.005 to 0.1:1

$F:SiO_2$=0.1 to 1:1

$N:SiO_2$=0.1 to 1:1

$H_2O:SiO_2$=1 to 50:1;

b) adding a seed crystal S of mordenite MOR molecular sieve into the initial mixture A obtained in step a), and stirring uniformly to obtain an initial gel B, wherein the mass ratio of the added seed crystal S to $SiO_2$ contained in the initial mixture A is $S:SiO_2$=0.005 to 0.1:1;

c) crystallizing the initial gel B obtained in step b) at a temperature in a range from 120° C. to 200° C. under autogenous pressure for 12 hours to 480 hours, d) filtering the solid product, separating and washing the solid product to neutral with water after the crystallization is completed, and then drying the solid product to obtain the mordenite MOR molecular sieve, wherein M in the inorganic base $M_2O$ represents an alkali metal; the additional reagent N matches with the channel size of the 8-membered ring "side pocket" and is one or more selected from the group consisting of methylamine, dimethylamine, trimethylamine, ethylamine, diethylamine, triethylamine, N-methyldiethylamine, N,N-dimethylethylamine, N-methylethylenediamine, N,N-dimethylethylenediamine, N,N,N-trimethylethylenediamine, N-ethylethylenediamine, N,N-diethylethylenediamine, N,N,N-triethylethylenediamine, N-methyl-N,N-diethylethylenediamine, N,N dimethyl-N-ethylethylenediamine, N,N,N,N-tetramethylethylenediamine, n-propylamine, di-n-propylamine, isopropylamine, tetramethylammonium hydroxide, tetramethylammonium bromide, tetramethylammonium chloride, tetramethylammonium iodide, methanol, ethanol, n-propanol and isopropanol.

In a preferred embodiment, the aluminum source is one or more selected from the group consisting of aluminum isopropoxide, aluminum oxide, aluminum hydroxide, aluminum chloride, aluminum sulfate and aluminum nitrate.

In a preferred embodiment, the silicon source is one or more selected from the group consisting of coarse pore silicon powder, fine pore silicon powder, silica sol, silicone gel, tetramethoxysilane, tetraethoxysilane and white carbon black.

In a preferred embodiment, the crystallization is static or dynamic crystallization.

In another aspect, provided is a mordenite MOR molecular sieve obtained according to the above method of the present invention, wherein B acid sites in the 8-membered ring "side pocket" accounts for 50% to 95% of the total number of B acid sites in the mordenite MOR molecular sieve.

In another aspect, the present invention provides a catalyst for carbonylation reaction of dimethyl ether, wherein the catalyst can be obtained by the following steps: the mordenite MOR molecular sieves synthesized by the above method in the presence of an inorganic base are subjected to calcination and ion exchange to remove inorganic alkali metal ion and then calcined in air at a temperature in a range from 400° C. to 700° C.; or the mordenite MOR molecular sieves synthesized by the above method in the absence of an inorganic base are calcined directly in air at a temperature in a range from 400° C. to 700° C.

The beneficial effects that can be realized by the present invention include:

1) the mordenite MOR molecular sieves with high crystallinity are obtained by the technical solution of the present invention as compared with the prior art.

2) a specific additional reagent matched with the channel size of the 8-membered ring "side pocket" in communication with the 12-membered ring main channel is used in the present invention, which is capable of entering the 8-membered ring "side pocket" to form active B acid sites of molecular sieve catalyst, thereby providing molecular sieve catalyst, wherein the location and distribution of B acid sites can be modulated directly, the ratio of B acid sites of the 8-membered ring "side pocket" to the total number of B acid sites in the molecular sieve catalyst can be modulated flexibly in a larger range (from 50% to 95%);

3) preparation method of the mordenite provided by the application is simple in process and is advantageous for large-scale industrial production;

4) the mordenite prepared by the method provided by the present invention used as a catalyst for the carbonylation reaction of dimethyl ether has advantages of high conversion rate, good selectivity and long life.

5) the mordenite MOR molecular sieve is synthesized in the present invention under an alkali-free metal system in the absence of an inorganic base to obtain the MOR molecular sieve containing no alkali metal ions, so that the catalyst preparation process from the synthetic product no longer requires an ion exchange step, instead the H-type molecular sieve catalyst can be directly obtained by calcination.

DETAILED DESCRIPTION

Figure 1:
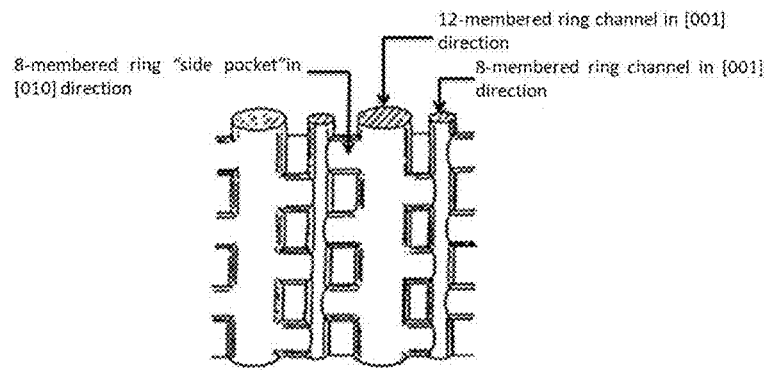
FIG. 1 shows a schematic view of channel framework of the MOR molecular sieve.

The method for synthesizing MOR molecular sieves with a direct-modulatable location and distribution of B acid sites provided by the present invention comprises the following aspects:

I. the present invention provides a method for synthesizing a mordenite MOR molecular sieve with acid sites being preferentially located in an 8-membered ring "side pocket" in the presence of an inorganic base, the method comprises the following steps:

a) mixing an aluminum source in terms of $Al_2O_3$, a silicon source in terms of $SiO_2$, an inorganic base $M_2O$, an additional reagent N, and water $H_2O$ to form an initial mixture A with the following molar ratio composition;

$Al_2O_3:SiO_2$=0.005 to 0.1:1

$M_2O:SiO_2$=0.05 to 1:1

$N:SiO_2$=0.1 to 1:1

$H_2O:SiO_2$=5 to 60:1;

b) adding a seed crystal S of mordenite MOR molecular sieve into the initial mixture A obtained in step a) at a certain percentage, and stirring uniformly to obtain an initial gel B, wherein the mass ratio of the added seed crystal S to $SiO_2$ contained in the initial mixture A is $S:SiO_2=0.005$ to $0.1:1$;

c) crystallizing the initial gel B(obtained in step b) at a temperature in a range from 120° C. to 200° C. under autogenous pressure for 12 hours to 240 hours;

d) filtering the solid product, separating and washing the solid product to neutral with water such as deionized water after the crystallization is completed, and then drying the solid product to obtain the MOR molecular sieve.

In the initial mixture A of the step a), the addition amount of silicon source is calculated by the mole number of $SiO_2$; the addition amount of aluminum source is calculated by the mole number of $Al_2O_3$; the addition amount of inorganic base is calculated by the mole number of inorganic base itself; the addition amount of additional reagent N is calculated by the mole number of additional reagent N itself; the addition amount of water is calculated by the mole number of water itself.

Preferably, the aluminum source in step a) is at least one selected from the group consisting of aluminum isopropoxide, aluminum oxide, aluminum hydroxide, aluminum chloride, aluminum sulfate, aluminum nitrate, and sodium aluminate.

Preferably, the inorganic base source in step a) is selected from at least one of lithium hydroxide or sodium hydroxide.

Preferably, the silicon source in step a) is at least one selected from the group consisting of coarse pore silicon powder, fine pore silicon powder, silica sol, silicone gel, tetramethoxysilane, tetraethoxysilane, white carbon black, and water glass.

In the present invention, the additional reagent N is an aliphatic amine or an aliphatic alcohol, and in order to meet the requirement of matching with the channel size of the 8-membered ring "side pocket", the additional reagent N needs to be selected to enable access to the 8-membered ring "side pocket". For this reason, if the substituents number of aliphatic amine is 4, it can only be a methyl group, and specifically, the aliphatic amine is anyone or any combination of tetramethylammonium hydroxide, tetramethylammonium bromide, tetramethylammonium chloride, tetramethylammonium iodide and N, N, N, N-tetramethylethylenediamine; if the substituents number of aliphatic amine is 3, it can only be methyl or ethyl, specifically, the aliphatic amine is anyone or any combination of trimethylamine or triethylamine, N-methyldiethylamine, N,N-dimethylethylamine, N,N,N-trimethylethylenediamine, N,N-dimethyl-N-ethylethylenediamine, N-methyl-N,N-diethylethylenediamine, N,N,N-triethylethylenediamine; if the substituents number of aliphatic amine or aliphatic alcohol is 2 or 1, the number of carbon atoms of the single substituent is no more than 3, specifically, the aliphatic amine or aliphatic alcohol is anyone or any combination of methylamine, dimethylamine, ethylamine, diethylamine, N-methylethylenediamine, N,N-dimethylethylenediamine, N-ethylethylenediamine, N,N-diethylethylenediamine, N-methyl-N-ethylethylenediamine, n-propylamine, di-n-propylamine, isopropylamine, methanol, ethanol, n-propanol and isopropanol.

Preferably, the additional reagent N in step a) may be anyone or any combination of methylamine (MA), dimethylamine (DMA), trimethylamine (TMA), ethylamine (EA), diethylamine (DEA), triethylamine (TEA), N, N-dimethylethylenediamine, n-propylamine (n-PA), di-n-propylamine (DPA), isopropylamine (i-PA), tetramethylammonium hydroxide (TMAOH), tetramethyl bromide Ammonium (TMABr), tetramethylammonium chloride (TMACl), tetramethylammonium iodide (TMAI), methanol ($CH_3OH$), ethanol ($C_2H_5OH$), n-propanol (n-$C_3H_7OH$) and isopropanol (i-$C_3H_7OH$).

The source of seed crystal of the mordenite MOR molecular sieve in step b) may be commercially available or may be synthesized in laboratory; it may be a raw powder before calcination, or a Na type, H type or $NH_4$ type sample after calcination.

Preferably, $Al_2O_3:SiO_2=0.01$ to $0.1$ in step a)
Preferably, $M_2O:SiO_2=0.05$ to $0.5$ in step a)
Preferably, $N:SiO_2=0.2$ to $0.6$ in step a)
Preferably, $H_2O:SiO_2=10$ to $50$ in step a)
Preferably, the temperature of the dynamic crystallization in the step c) is in a range from 130° C. to 180° C.
Preferably, the crystallization time of the dynamic crystallization in step c) is in a range from 12 hours to 96 hours.

The crystallization in step c) may be either dynamic crystallization or static crystallization.

The separation methods in step c) can be centrifugation separation or filtration separation.

II. the present invention further provides a method for synthesizing a mordenite MOR molecular sieve with B acid sites being preferentially located in the 8-membered ring "side pocket" in the absence of inorganic base, wherein alkali metal is absent from the reaction system and the synthesis steps are as follows:

a) mixing an aluminum source in terms of $Al_2O_3$, a silicon source in terms of $SiO_2$, an additional reagent N, fluorine-containing reagent F and water $H_2O$ to form an initial mixture A with the following molar ratio;

$Al_2O_3:SiO_2=0.005$ to $0.1:1$ $F:SiO_2=0.1$ to $1:1$ $N:SiO_2=0.1$ to $1:1$ $H_2O:SiO_2=1$ to $50:1$;

b) adding a seed crystal S of mordenite MOR molecular sieve into the initial mixture A obtained in step a) at a certain percentage, and stirring uniformly to obtain an initial gel B, wherein the mass ratio of the added seed crystal S to $SiO_2$ contained in initial gel B is $S:SiO_2=0.005$ to $0.1:1$;

c) crystallizing the initial gel B obtained in step b) at a temperature in a range from 120° C. to 200° C. under autogenous pressure for 12 hours to 480 hours;

d) filtering the solid product, separating and washing the solid product to neutral with water such as deionized water after the crystallization is completed, and then drying the solid product to obtain the mordenite MOR molecular sieve.

In the step a), the addition amount of silicon source is calculated by the mole number of $SiO_2$; the addition amount of aluminum source is calculated by the mole number of $Al_2O_3$; the addition amount of fluorine-containing reagent F is calculated by the mole number of fluorine-containing reagent F itself; the addition amount of additional reagent N is calculated by the mole number of additional reagent N itself; the addition amount of water is calculated by the mole number of water itself.

Preferably, the aluminum source in step a) is at least one selected from the group consisting of aluminum isopropoxide, aluminum oxide, aluminum hydroxide, aluminum chloride, aluminum sulfate, aluminum nitrate.

Preferably, the silicon source in step a) is at least one selected from the group consisting of coarse pore silicon powder, fine pore silicon powder, silica sol, silicone gel, tetramethoxysilane, tetraethoxysilane, white carbon black.

In the present invention, the additional reagent N is an aliphatic amine or an aliphatic alcohol, and in order to meet the requirement of matching with the channel size of the 8-membered ring "side pocket", the additional reagent N needs to be selected to enable access to the 8-membered ring "side pocket". For this reason, if the substituents number of aliphatic amine is 4, it can only be a methyl group, and specifically, the aliphatic amine is anyone or any combination of tetramethylammonium hydroxide, tetramethylammonium bromide, tetramethylammonium chloride, tetramethylammonium iodide and N, N, N, N-tetramethylethylenediamine; if the substituents number of aliphatic amine is 3, it can only be methyl or ethyl, specifically, the aliphatic amine is anyone or any combination of trimethylamine or triethylamine, N-methyldiethylamine, N,N-dimethylethylamine, N,N,N-trimethylethylenediamine, N,N-dimethyl-N-ethylethylenediamine, N-methyl-N,N-diethylethylenediamine, N,N,N-triethylethylenediamine; if the substituents number of aliphatic amine or aliphatic alcohol is 2 or 1, the number of carbon atoms of the single substituent is no more than 3, specifically, the aliphatic amine or aliphatic alcohol is anyone or any combination of methylamine, dimethylamine, ethylamine, diethylamine, N-methylethylenediamine, N,N-dimethylethylenediamine, N-ethylethylenediamine, N,N-diethylethylenediamine, N-methyl-N-ethylethylenediamine, n-propylamine, di-n-propylamine, isopropylamine, methanol, ethanol, n-propanol and isopropanol.

Preferably, the additional reagent N in step a) may be anyone or any combination of methylamine (MA), dimethylamine (DMA), trimethylamine (TMA), ethylamine (EA), diethylamine (DEA), triethylamine (TEA), N, N-dimethylethylenediamine, n-propylamine (n-PA), di-n-propylamine (DPA), isopropylamine (i-PA), tetramethylammonium hydroxide (TMAOH), tetramethyl bromide Ammonium (TMABr), tetramethylammonium chloride (TMACl), tetramethylammonium iodide (TMAI), methanol ($CH_3OH$), ethanol ($C_2H_5OH$), n-propanol (n-$C_3H_7OH$) and isopropanol (i-$C_3H_7OH$); the fluorine-containing reagent F in the step a) is at least one of hydrofluoric acid or amine fluoride.

The source of seed crystal of the mordenite MOR molecular sieve in step b) may be commercially available or may be synthesized in laboratory; it may be a raw powder before calcination, or a H type or $NH_4$ type sample after calcination.

Preferably, $Al_2O_3:SiO_2=0.01$ to 0.1 in step a)

Preferably, $M_2O:SiO_2=0.05$ to 0.5 in step a)

Preferably, $N:SiO_2=0.2$ to 0.8 in step a)

Preferably, $H_2O:SiO_2=3$ to 30 in step a)

Preferably, the temperature of the dynamic crystallization in the step c) is in a range from 130° C. to 180° C.

Preferably, the crystallization time of the dynamic crystallization in step c) is in a range from 12 hours to 240 hours.

The crystallization in step c) may be either dynamic crystallization or static crystallization.

The separation methods in step c) comprise centrifugation separation or filtration separation.

According to the another aspect of this present application, provided is a catalyst for the carbonylation reaction of dimethyl ether, which has the advantages of high conversion rate of dimethyl ether, high selectivity to methyl acetate, and long life. The catalyst is obtained by the calcination of the mordenite with B acid sites being preferentially located in a 8-membered ring "side pocket" prepared by any method described above (wherein the mordenite containing an alkali metal ion needs to be treated with an ion exchange method, such as ammonium ion exchange) at a temperature in a range from 400° C. to 700° C. in air.

The present invention is described in detail below by means of examples, but the present invention is not limited to the examples.

The analytical methods in the examples of the present application are as follows:

X-ray powder diffraction phase analysis (XRD) is carried out using a X'Pert PRO X-ray diffractometer from the PANalytical Company of the Netherlands, a Cu target, a Kα radiation source (λ=0.15418 nm), a voltage of 40 KV, and a current of 40 mA.

A scanning electron microscope (SEM) test is performed on a Hitachi SU 8020 field emission scanning electron microscope with an acceleration voltage of 2 kV.

Measurements of $^1H$ MAS NMR spectra are tested on a Varian Infinity plus-400 nuclear magnetic resonance spectroscopy using a 4 mm probe. Spin-echo program is used, the rotate speed is 12 kHz, the sampling numbers is 32, the pulse width of π/4 is 4.4 μs, and the sampling delay is 10 s. Amantadine is used as a chemical shift reference and corrected to 1.74 ppm. Before the measurement, the sample is vacuum dehydrated at a temperature of 400° C. and a pressure below $10^{-3}$ Pa for more than 20 hours to remove water and impurities adsorbed in the molecular sieve. The sample is transferred to a nuclear magnetic rotor under the protection of atmospheric pressure nitrogen atmosphere in a glove box for $^1H$ MAS NMR spectrum test.

Gas sample analysis is performed on-line using an Agilent 6890 GC gas chromatograph with an Agilent HP-5 capillary column.

EXAMPLE 1

Synthesis of Mordenite MOR Molecular Sieve by Adding Additional Reagent of Trimethylamine in the Presence of Inorganic Base of NaOH Firstly, 0.67 g of sodium metaaluminate is dissolved in deionized water, and 1.88 g of sodium hydroxide is added thereto. After a clear solution is formed, 37.65 g of silica sol (with a $SiO_2$ content of 28.5%) and 4.54 g of trimethylammonium are added, stirring is continued at room temperature until a uniform silica-alumina gel is formed, and then 0.1 g of MOR seed crystals are added into the formed silica-alumina gel to form a mixed raw material, and finally the mixed raw material is transferred to a stainless steel reaction vessel with a polytetrafluoroethylene liner, dynamic crystallization is performed for 48 hours at 170° C., the molar ratio of the reaction raw materials is as follows: $0.025Al_2O_3:SiO_2:0.08Na_2O:0.28$ TMA:$20H_2O$, the product is treated through suction filtration and dried to obtain MOR molecular sieves.

Figure 2:
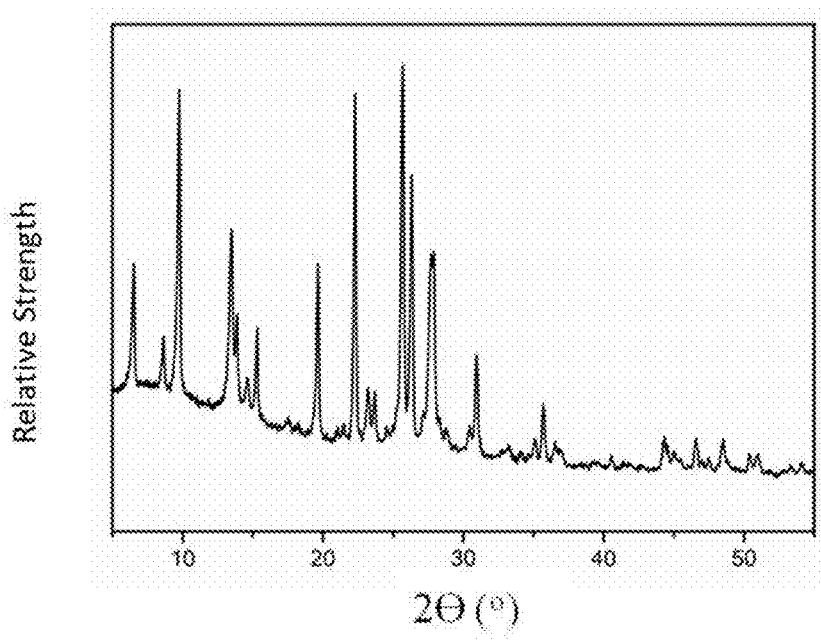
FIG. 2 is a XRD spectrum of mordenite MOR sample synthesized in Example 1.

FIG. 2 is a XRD spectrum of the sample. As can be seen from FIG. 2, the obtained molecular sieve sample has a typical mordenite MOR molecular sieve structure, and has high purity and crystallinity, and a typical XRD spectrum represented by sample 1# is shown as FIG. 2, and the XRD diffraction peak datas thereof are shown in Table 1.

TABLE 1

XRD diffraction peak datas of sample 1#

| Peak number | 2θ [°] | $I/I_0$ * 100 |
|---|---|---|
| 1 | 6.5153 | 34.09 |
| 2 | 8.6343 | 15.84 |
| 3 | 9.7673 | 81.44 |
| 4 | 13.484 | 47.32 |
| 5 | 13.882 | 25.84 |

TABLE 1-continued

XRD diffraction peak datas of sample 1#

| Peak number | 2θ [°] | I/I$_0$ * 100 |
|---|---|---|
| 6 | 14.6369 | 10.17 |
| 7 | 15.2996 | 24.66 |
| 8 | 17.5842 | 1.92 |
| 9 | 19.6458 | 45.45 |
| 10 | 21.0838 | 2.72 |
| 11 | 21.4997 | 4.2 |
| 12 | 22.29 | 89.48 |
| 13 | 23.2093 | 13.92 |
| 14 | 23.6732 | 13.76 |
| 15 | 24.5671 | 3.68 |
| 16 | 25.6795 | 100 |
| 17 | 26.3246 | 71.19 |
| 18 | 27.1554 | 9.72 |
| 19 | 27.6522 | 48.61 |
| 20 | 27.904 | 50.61 |
| 21 | 28.3143 | 7.78 |
| 22 | 28.721 | 5.05 |
| 23 | 30.4405 | 7.65 |
| 24 | 30.9577 | 26.17 |
| 25 | 33.2431 | 2.86 |
| 26 | 34.0683 | 2.03 |
| 27 | 35.1127 | 6.04 |
| 28 | 35.677 | 15.01 |
| 29 | 36.5319 | 5.3 |
| 30 | 36.973 | 3.7 |
| 31 | 39.311 | 1.26 |
| 32 | 40.5253 | 3.1 |
| 33 | 41.6509 | 0.88 |
| 34 | 42.7121 | 0.72 |
| 35 | 44.342 | 7.52 |
| 36 | 44.9558 | 4.35 |
| 37 | 45.5057 | 2.46 |
| 38 | 46.5543 | 8.44 |
| 39 | 47.4486 | 3.6 |
| 40 | 48.5007 | 8.35 |
| 41 | 50.4051 | 4.78 |
| 42 | 50.9485 | 4.56 |
| 43 | 53.2869 | 2.04 |
| 44 | 54.1035 | 2.51 |

Figure 3:
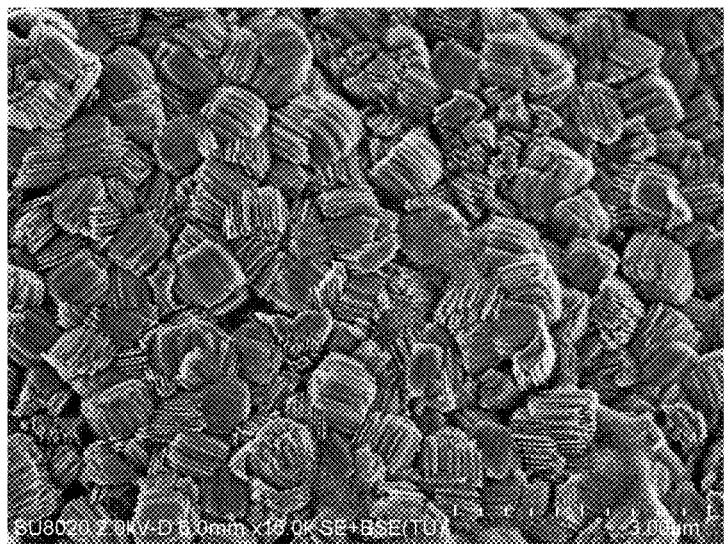
FIG. 3 is a SEM image of a mordenite MOR sample synthesized in Example 1.

FIG. 3 is a SEM image of the sample obtained in Example 1. As can be seen from FIG. 3, the sample is agglomerated from sheets having sizes of about 500 to 700 nm*300 to 400 nm*50 to 70 nm.

The MOR molecular sieves obtained in Example 1 are calcined in air at a temperature of 600° C. to remove organics, and subjected to ammonium ion exchange NH$_4$NO$_3$, 1 Mol/L) at a temperature of 80° C. for 2 times, each time for 2 hours, and then which are calcined at 550° C. for 6 hours to obtain H-MOR molecular sieves.

The resulting H-MOR molecular sieves are tested on a Varian Infinity plus-400 NMR spectrometer using $^1$H MAS NMR with a 4 mm probe. The spin-echo program is used with a rotate speed of 12 kHz. Amantadine is used as a chemical shift reference and corrected to 1.74 ppm. Before the test, the sample is vacuum dehydrated at a temperature of 400° C. and a pressure below $10^{-3}$ Pa for more than 20 hours to remove water and impurities adsorbed in the molecular sieve. The sample is transferred to a nuclear magnetic rotor under the protection of atmospheric pressure nitrogen atmosphere in a glove box for $^1$H MAS NMR spectrum test. Hexafluoroethylene propanol (CF$_3$CHOHCF$_3$) is used as a guide sample for quantitative determination. The amount of acid at 3.8 ppm is the total amount of B acid sites, and the sample is subjected to pyridine adsorption after measurement (adsorption method is referred to [ME Davis et al. J. Phys. Chem. C, 2011, 115, 1096-1102]), then the sample is subjected to $^1$H MAS NMR test. At this time, the signal of B acid sites of the main channel in 12-membered ring after adsorbing pyridine is moved to 15 ppm, and the signal at 3.8 ppm still belonged to the B acid sites generated by the 8-side ring "side pocket". As a result, the B acid sites in the "side pocket" of the 8-membered ring channel accounts for 87% of the total number of B acid sites.

EXAMPLES 2-12 PREPARATION OF SAMPLES 2# TO 12#

The specific proportion of ingredients and crystallization conditions are shown in Table 2, and the specific proportioning process is the same as in Example 1.

The synthesized samples are analyzed by XRD, and the data results are close to those of FIG. 2, that is, the positions and shapes of the diffraction peaks are the same, and the relative peak intensity fluctuated within ±5% according to the change of the synthesis conditions, indicating that the synthesized products are all pure phase mordenite MOR. The calcined and ion-exchanged samples are subjected to an acid test, and the test method is the same as that in Example 1.

TABLE 2 table of ingredients for synthesizing molecular sieve and crystallization conditions

| Sample No. | The types and molar ratios (based on SiO$_2$) of aluminum source*, silicon source*, water, inorganic base source** and additional reagent (N) in the raw material | Crystallization method | Crystallization temperature/ ° C. | Crystallization time/hour | Ratio of B acid in 8-membered ring (%) |
|---|---|---|---|---|---|
| 1# | 0.025Al$_2$O$_3^I$:1SiO$_2^a$:0.08Na$_2$O: 20H$_2$O:0.28TMA | dynamic | 170 | 48 | 87 |
| 2# | 0.005Al$_2$O$_3^{II}$:1SiO$_2^g$: 0.10Na$_2$O:13H$_2$O: 0.36TMAOH | dynamic | 120 | 240 | 76 |
| 3# | 0.01Al$_2$O$_3^V$:1SiO$_2^a$:0.15Na$_2$O: 30H$_2$O:0.15TEA | dynamic | 140 | 144 | 63 |
| 4# | 0.03Al$_2$O$_3^{III}$:1SiO$_2^f$: 0.18Na$_2$O:50H$_2$O:0.30 N,N-dimethylethylenediamine | dynamic | 160 | 48 | 50 |
| 5# | 0.05Al$_2$O$_3^{VI}$:1SiO$_2^b$: 0.15Na$_2$O:10H$_2$O:0.45MA | static | 180 | 108 | 74 |
| 6# | 0.1Al$_2$O$_3^{VI}$:1SiO$_2^h$:0.20Na$_2$O: 60H$_2$O:0.50EA | dynamic | 200 | 12 | 55 |

TABLE 2-continued table of ingredients for synthesizing molecular sieve and crystallization conditions

| Sample No. | The types and molar ratios (based on $SiO_2$) of aluminum source*, silicon source*, water, inorganic base source** and additional reagent (N) in the raw material | Crystallization method | Crystallization temperature/ ° C. | Crystallization time/hour | Ratio of B acid in 8-membered ring (%) |
|---|---|---|---|---|---|
| 7# | $0.025Al_2O_3^{VII}$:1$SiO_2^{c}$:<br>0.38$Li_2O$:100$H_2O$:0.11 DEA | dynamic | 170 | 72 | 71 |
| 8# | $0.01Al_2O_3^{V}$:1$SiO_2^{c}$:0.38$Li_2O$:<br>25$H_2O$:0.24 DMA | dynamic | 180 | 72 | 60 |
| 9# | $0.020Al_2O_3^{IV}$:1$SiO_2^{d}$:<br>0.10$Na_2O$:0.10$Li_2O$:<br>25$H_2O$:0.15DPA | dynamic | 170 | 24 | 79 |
| 10# | $0.030Al_2O_3^{II}$:1$SiO_2^{e}$:0.40$Li_2O$:<br>30$H_2O$:0.20 $C_3H_7OH$ | dynamic | 150 | 100 | 54 |
| 11# | $0.05Al_2O_3^{II}$:1$SiO_2^{f}$:0.10$Li_2O$:<br>30$H_2O$:0.60 i-PA | dynamic | 165 | 96 | 94 |
| 12# | $0.1Al_2O_3^{II}$:1$SiO_2^{b}$:0.29$Li_2O$:<br>50$H_2O$:0.27TMACl | static | 170 | 36 | 63 |

Note
*silicon source: $^a$silica sol; $^b$white carbon black; $^c$tetraethoxysilane; $^d$tetramethyl orthosilicate; $^e$silicon gel; $^f$water glass; $^g$coarse pore silicon powder; $^h$fine pore silicon powder. Aluminum source: $^I$sodium aluminate; $^{II}$aluminum chloride; $^{III}$aluminum hydroxide; $^{IV}$aluminum sulfate; $^V$alumina; $^{VI}$isopropoxide aluminum; $^{VII}$aluminum nitrate.

Note
**the ratio of $Na_2O$ and $Li_2O$ is calculated by the metal oxides of $Na_2O$ and $Li_2O$ contained in the added aluminum source, silicon source and base source.

EXAMPLES 13

Synthesis of Mordenite MOR Molecular Sieve by Adding Additional Reagent of Tetramethylamine Hydroxide in the Absence of Inorganic Base Firstly, aluminum nitrate is dissolved in deionized water, and then tetramethylammonium hydroxide is added thereto. After a clear solution is formed, a silica gel and hydrofluoric acid are added, then stirring is continued at room temperature until a uniform silica-alumina gel is formed and then MOR seed crystals are added into the formed silica-alumina gel (the mass of MOR seed crystals accounted for 1% of $SiO_2$ in the gel feeding) to form a mixed raw material, and the mixed raw material is transferred to a stainless steel reaction vessel with a polytetrafluoroethylene liner, dynamic crystallization is performed for 96 hours at 180° C., the molar ratio of the reaction raw materials is as follows: $SiO_2$:0.01$Al_2O_3$:0.35TMAOH:0.30HF:40$H_2O$, the product is treated through suction filtration and dried to obtain mordenite MOR.

The synthesized samples are analyzed by XRD, and the data results are close to those of FIG. 2, that is, the positions and shapes of the diffraction peaks are the same, and the relative peak intensity fluctuated within ±5% according to the change of the synthesis conditions, indicating that the synthesized products are all pure phase MOR.

Figure 4:
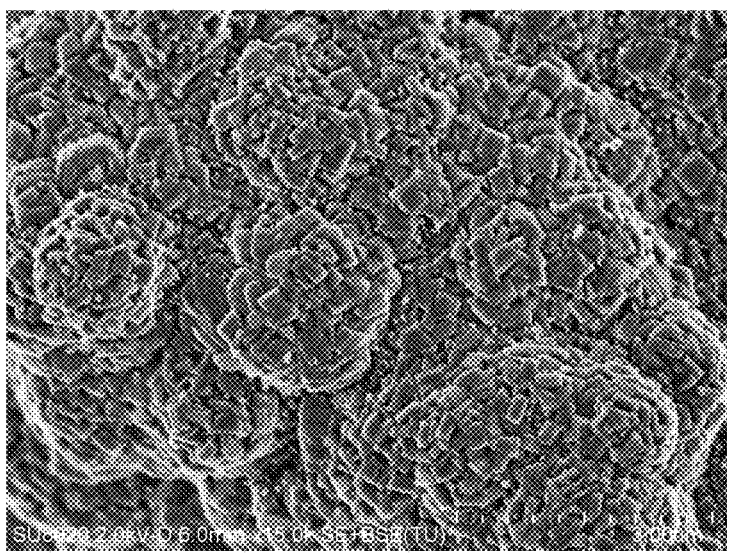
FIG. 4 is a SEM image of a mordenite MOR sample synthesized in Example 13.

FIG. 4 is a SEM image of the sample obtained in Example 13. As can be seen from FIG. 4, the sample has a cauliflower-like morphology accumulated from cuboid block samples with a size of about 300 nm*150 nm*100 nm.

The test method on sample No. is 13# is the same as that in Example 1. B acid sites in the 8-membered ring "side pocket" of the mordenite MOR molecular sieve are tested to account for 90% of the total number of B acid sites.

EXAMPLES 14 TO 24 PREPARATION OF SAMPLES 14 TO 24

The specific proportion of ingredients and crystallization conditions are shown in Table 3, and the specific proportioning process is the same as in Example 13.

The synthesized samples are analyzed by XRD, and the data results are close to those of FIG. 2, that is, the positions and shapes of the diffraction peaks are the same, and the relative peak intensity fluctuated within ±5% according to the change of the synthesis conditions, indicating that the synthesized products are all pure phase MOR. The calcined and ion-exchanged samples are subjected to an acid test, and the test method is the same as that in Example 13.

TABLE 3 table of ingredients for synthesizing molecular sieve and crystallization conditions

| Sample No. | The types and molar ratios (based on $SiO_2$) of aluminum source*, silicon source*, water, fluorine-containing reagent and additional reagent (N) in the raw material | Crystallization method | Crystallization temperature/ ° C. | Crystallization time/hour | Ratio of B acid in 8-membered ring (%) |
|---|---|---|---|---|---|
| 13# | $0.01Al_2O_3^{I}$:1$SiO_2^{a}$:0.1HF:<br>40$H_2O$:0.35TMAOH | dynamic | 180 | 96 | 90 |
| 14# | $0.005Al_2O_3^{II}$:1$SiO_2^{g}$:0.1HF:<br>13$H_2O$:0.76DMA | dynamic | 120 | 480 | 78 |
| 15# | $0.01Al_2O_3^{V}$:1$SiO_2^{a}$:0.15HF:<br>30$H_2O$:0.45TEA | dynamic | 140 | 144 | 65 |

TABLE 3-continued table of ingredients for synthesizing molecular sieve and crystallization conditions

| Sample No. | The types and molar ratios (based on $SiO_2$) of aluminum source*, silicon source*, water, fluorine-containing reagent and additional reagent (N) in the raw material | Crystallization method | Crystallization temperature/ °C. | Crystallization time/hour | Ratio of B acid in 8-membered ring (%) |
|---|---|---|---|---|---|
| 16# | $0.03Al_2O_3{}^{III}$:$1SiO_2{}^f$:0.28HF: 50$H_2O$:0.10 N,N-dimethylethylenediamine | dynamic | 160 | 48 | 51 |
| 17# | $0.05Al_2O_3{}^{VI}$:$1SiO_2{}^b$:0.15HF: 3$H_2O$:0.65MA | static | 180 | 240 | 77 |
| 18# | $0.1Al_2O_3{}^{VI}$:$1SiO_2{}^a$:0.20HF: 40$H_2O$:0.50EA | dynamic | 200 | 12 | 58 |
| 19# | $0.025Al_2O_3{}^I$:$1SiO_2{}^c$: 0.60$NH_4F$:50$H_2O$:0.41 DEA | dynamic | 170 | 72 | 74 |
| 20# | $0.01Al_2O_3{}^V$:$1SiO_2{}^c$:0.20 $NH_4F$:25$H_2O$:0.24 i-PA | dynamic | 180 | 72 | 62 |
| 21# | $0.020Al_2O_3{}^{IV}$:$1SiO_2{}^d$:0.10 $NH_4F$:0.10TMAI:25$H_2O$: | dynamic | 170 | 24 | 81 |
| 22# | $0.030Al_2O_3{}^{II}$:$1SiO_2{}^e$:0.40 $NH_4F$:30$H_2O$:0.20 $C_2H_5OH$: 0.3MA | dynamic | 150 | 100 | 57 |
| 23# | $0.05Al_2O_3{}^{II}$:$1SiO_2{}^f$:0.50 $NH_4F$:30$H_2O$:0.60TMA | dynamic | 165 | 96 | 95 |
| 24# | $0.1Al_2O_3{}^{II}$:$1SiO_2{}^b$:0.29 $NH_4F$: 50$H_2O$:0.67n-PA | dynamic | 170 | 36 | 66 |

Note
*silicon source: [a]silica sol; [b]white carbon black; [c]tetraethoxysilane; [d]tetramethyl orthosilicate; [e]silicon gel; [f]coarse pore silicon powder; [g]fine-pored silicon powder. Aluminum source: [I]aluminum nitrate; [II]aluminum chloride; [III]aluminum hydroxide; [IV]aluminum sulfate; [V]alumina; [VI]isopropoxide aluminum.

The sample obtained in Example 1 is subjected to ion exchange with $NH_4NO_3$ to remove sodium ions, and calcined in air at a temperature from 400° C. to 600° C. for 4 hours, and then compressed and crushed to 40 to 60 mesh. 0.6 g of the treated sample (i.e., catalyst C1#) is weighed and loaded into a fixed bed reactor for evaluating the carbonylation reaction of dimethyl ether (DME). At the beginning of the reaction, activation is performed for 1 hour at 550° C. by introducing nitrogen, followed by decreasing the temperature to 200° C. to carry out the reaction. The air inflow of mixture gas (DME/CO/$N_2$/He=5/50/2.5/42.5, Vol %) is 12.5 ml/min and the reaction pressure is 1.0 Mpa. The reaction product is analyzed on-line using 6890 GC gas chromatograph from Agilent Technologies in USA. The column is an Agilent HP-5 capillary column from Agilent Technologies in USA. The results show that after the induction period of 1 hour, the conversion rate of DME is 88.3%, the selectivity to methyl acetate in the product reaches to 99.5%, and the stability is good. The conversion rate of DME remained above 85% after reacting for 48 hours.

The samples obtained in the other Examples 2 to 24 are treated as above, and the catalysts 2# to 24# are respectively obtained and are used for the carbonylation reaction of dimethyl ether. The reaction results are shown in Table 4.

TABLE 4

Catalysts C1# to C24# prepared from samples 1# to 24# and the carbonylation reaction results of dimethyl ether

| Catalyst No. | Conversion rate[a] of DME | Selectivity[b] to methyl acetate |
|---|---|---|
| C1# | 88.3% | 99.5% |
| C2# | 76.2% | 98.9% |
| C3# | 60.9% | 98.4% |
| C4# | 52.3% | 99.1% |
| C5# | 78.5% | 99.4% |
| C6# | 57.7% | 99.0% |
| C7# | 77.9% | 99.2% |
| C8# | 62.7% | 98.9% |
| C9# | 80.4% | 99.1% |
| C10# | 55.2% | 99.2% |
| C11# | 87.3% | 98.7% |
| C12# | 68.8% | 99.0% |
| C13# | 95.2% | 99.0% |
| C14# | 79.4% | 99.1% |
| C15# | 68.6% | 99.0% |
| C16# | 51.7% | 98.9% |
| C17# | 79.9% | 98.4% |
| C18# | 65.6% | 99.1% |
| C19# | 77.2% | 99.1% |
| C20# | 63.5% | 98.9% |
| C21# | 82.5% | 98.5% |
| C22# | 58.8% | 98.9% |
| C23# | 81.5% | 99.2% |
| C24# | 62.2% | 99.1% |

Notes:
[a]The highest conversion rate during the reaction.
[b]The selectivity to methyl acetate at the highest conversion rate during the reaction.

The above are only exemplary embodiments of the present invention, and are not intended to limit the present invention in any form. A variety change or modification utilizing the technical content disclosed above made by the person skilled in art all fall within the protection scope of the present invention.

The invention claimed is:

1. A method for synthesizing a mordenite MOR molecular sieve with B acid sites being located in an 8-membered ring side pocket in the presence of an inorganic base, the method comprises:

a) mixing an aluminum source in terms of $Al_2O_3$, a silicon source in terms of $SiO_2$, an inorganic base $M_2O$, an additional reagent N, and water $H_2O$ to form an initial mixture A with the following molar ratio composition:

$Al_2O_3:SiO_2=0.005$ to 0.1:1

$M_2O:SiO_2=0.05$ to 1:1

$N:SiO_2=0.1$ to 1:1

$H_2O:SiO_2=5$ to 60:1;

b) adding a seed crystal S of mordenite MOR molecular sieve into the initial mixture A obtained in step a), and stirring uniformly to obtain an initial gel B, wherein the mass ratio of the added seed crystal S to $SiO_2$ contained in the initial mixture A is $S:SiO_2=0.005$ to 0.1:1;

c) crystallizing the initial gel B obtained in step b) at a temperature in a range from 120° C. to 200° C. under autogenous pressure for 12 hours to 240 hours;

d) filtering the solid product, separating and washing the solid product to neutral with deionized water after the crystallization is completed, and then drying the solid product to obtain the mordenite MOR molecular sieve, wherein M in the inorganic base $M_2O$ represents an alkali metal; the additional reagent N matches with the channel size of the 8-membered ring side pocket and is one or more selected from the group consisting of methylamine, dimethylamine, trimethylamine, ethylamine, diethylamine, triethylamine, N-methyldiethylamine, N,N-dimethylethylamine, N-methylethylenediamine, N,N-dimethylethylenediamine, N,N,N-trimethylethylenediamine, N-ethylethylenediamine, N,N-diethylethylenediamine, N,N,N-triethylethylenediamine, N-methyl-N,N-diethylethylenediamine, N,N dimethyl-N-ethylethylenediamine, N,N,N,N-tetramethylethylenediamine, n-propylamine, di-n-propylamine, isopropylamine, tetramethylammonium hydroxide, tetramethylammonium bromide, tetramethylammonium chloride, tetramethylammonium iodide, methanol, ethanol, n-propanol and isopropanol.

2. The method according to claim 1, wherein the aluminum source is one or more sources selected from the group consisting of aluminum isopropoxide, aluminum oxide, aluminum hydroxide, aluminum chloride, aluminum sulfate, aluminum nitrate, and sodium aluminate.

3. The method according to claim 1, wherein the silicon source is one or more sources selected from the group consisting of coarse pore silicon powder, fine pore silicon powder, silica sol, silicone gel, tetramethoxysilane, tetraethoxysilane, and water glass.

4. The method according to claim 1, wherein the source of inorganic base is one or two of lithium hydroxide and sodium hydroxide.

5. The method according to claim 1, wherein the B acid sites in the 8-membered ring side pocket account for 50-95% of the total number of B acid sites in the mordenite MOR molecular sieve.

6. A method for preparing catalyst for carbonylation reaction of dimethyl ether comprising the following steps: treating the mordenite MOR molecular sieves synthesized by the method of claim 1 with calcination and ion exchange processes to remove inorganic alkali metal ion and then calcining the mordenite MOR molecular sieves in air at a temperature in a range from 400° C. to 700° C. to obtain the catalyst.

7. A method for synthesizing a mordenite MOR molecular sieve with B acid sites being located in an 8-membered ring side pocket in the absence of an inorganic base, wherein alkali metal is absent from the reaction system, the method comprises:

a) mixing an aluminum source in terms of $Al_2O_3$, a silicon source in terms of $SiO_2$, an additional reagent N, fluorine-containing reagent F and water $H_2O$ to form an initial mixture A with the following molar ratio:

$Al_2O_3:SiO_2=0.005$ to 0.1:1

$F:SiO_2=0.01$ to 1:1

$N:SiO_2=0.1$ to 1:1

$H_2O:SiO_2=1\sim50:1$;

b) adding a seed crystal S of mordenite MOR molecular sieve into the initial mixture A obtained in step a), and stirring uniformly to obtain an initial gel B, wherein the mass ratio of the added seed crystal S to $SiO_2$ contained in the initial mixture A is $S:SiO_2=0.005$ to 0.1:1;

c) crystallizing the initial gel B obtained in step b) at a temperature in a range from 120° C. to 200° C. under autogenous pressure for 12 hours to 480 hours;

d) filtering the solid product, separating and washing the solid product to neutral with deionized water after the crystallization is completed, and then drying the solid product to obtain the mordenite MOR molecular sieve, wherein M in the inorganic base $M_2O$ represents an alkali metal; the additional reagent N matches with the channel size of the 8-membered ring a side pocket and is one or more selected from the group consisting of methylamine, dimethylamine, trimethylamine, ethylamine, diethylamine, triethylamine, N-methyldiethylamine, N,N-dimethylethylamine, N-methylethylenediamine, N,N-dimethylethylenediamine, N,N,N-trimethylethylenediamine, N-ethylethylenediamine, N,N-diethylethylenediamine, N,N,N-triethylethylenediamine, N-methyl-N,N-diethylethylenediamine, N,N-dimethyl-N-ethylethylenediamine, N,N,N,N-tetramethylethylenediamine, n-propylamine, di-n-propylamine, isopropylamine, tetramethylammonium hydroxide, tetramethylammonium bromide, tetramethylammonium chloride, tetramethylammonium iodide, methanol, ethanol, n-propanol and isopropanol.

8. The method according to claim 7, wherein the aluminum source is one or more sources selected from the group consisting of aluminum isopropoxide, aluminum oxide, aluminum hydroxide, aluminum chloride, aluminum sulfate and aluminum nitrate.

9. The method according to claim 8, wherein the silicon source is one or more sources selected from the group consisting of coarse pore silicon powder, fine pore silicon powder, silica sol, silicone gel, tetramethoxysilane, and tetraethoxysilane.

* * * * *